Patented Aug. 16, 1927.

1,638,833

UNITED STATES PATENT OFFICE.

MOSES L. CROSSLEY, OF BOUNDBROOK, AND MAURICE L. DOLT, OF SOMERVILLE, NEW JERSEY, ASSIGNORS TO THE CALCO CHEMICAL COMPANY, OF BOUNDBROOK, NEW JERSEY, A CORPORATION OF NEW JERSEY.

MERCURY SALT OF 2-PHENYLQUINOLINE-4-CARBOXYLIC ACID AND PROCESS OF PRODUCING THE SAME.

No Drawing.   Application filed June 9, 1925.   Serial No. 36,011.

This invention relates to the manufacture of the mercury salt of 2-phenylquinoline-4-carboxylic acid which salt has the following structural chemical formula:

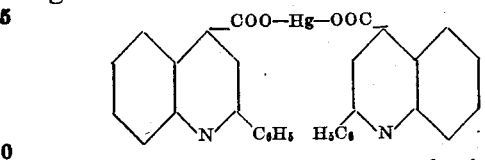

The new product may be obtained by treating an aqueous solution of the sodium salt or any other soluble salt of 2-phenylquinoline-4-carboxylic acid with an aqueous solution of mercuric chloride, mecuric acetate or other soluble mercuric salts as hereinafter described.

100 parts of pure 2-phenylquinoline-4-carboxylic acid are dissolved in 155.7 parts of 10% NaOH and 1000 parts of water. The resulting solution is filtered if not absolutely clear. To this solution is added, while stirring, a solution of 54.3 parts of $HgCl_2$ in 1500 parts of water. A yellow precipitate soon forms. This is filtered off and washed with water. In more concentrated solutions the precipitation of the mercuric salt is not complete in the cold, but a second precipitate is obtained when the clear filtrate is heated. The precipitates, however, all have the same chemical composition and, when dry, correspond to the formula $(C_{15}H_{10}N.CO_2)_2Hg$.

As an alternative process, 100 parts of pure 2-phenylquinoline-4-carboxylic acid are dissolved in 155.7 parts of 10% NaOH and 1000 parts of water. The solution is filtered if not absolutely clear. To this solution, while stirring, is added a solution of 63.7 parts of mercuric acetate in 1000 parts of water. After the precipitate has become flocculent, it is filtered off, washed with water and dried. Its chemical composition corresponds to the formula $(C_{15}H_{10}N.CO_2)_2Hg$.

The mercuric salt of 2-phenylquinoline-4-carboxylic acid is a yellowish white product, non-crystalline, insoluble in water and in all ordinary organic solvents such as ethyl and methyl alcohols, acetone, benzene, etc. It is comparatively stable at room temperature and even at 100° C. Aqueous solutions of sodium chloride dissolve it with the formation of the sodium salt of 2-phenylquinoline-4-carboxylic acid and $HgCl_2$. It is adapted for use, more particularly, as a therapeutic and medicinal agent.

It will be understood to those skilled in the art, that in obtaining the general result desired, the specific processes described may be modified within reasonable limits without departing from the spirit or substance of the invention, the scope of which is commensurate with the appended claims.

Having thus fully described the invention, what we claim as new and desire to secure by Letters Patent is:

1. As a new product, the neutral mercury salt of 2-phenylquinoline-4-carboxylic acid.
2. As a new product, a yellowish white, non-crystalline organic salt, insoluble in water and in all ordinary organic solvents such as ethyl and methyl alcohols, acetone and benzene and corresponding to the formula $(C_{15}H_{10}N.CO_2)_2Hg$.
3. The process of making the mercury salt of 2-phenylquinoline-4-carboxylic acid, which consists in treating a solution of a soluble salt of 2-phenylquinoline-4-carboxylic acid with an aqueous solution of a soluble mercuric salt.
4. The process of making the mercury salt of 2-phenylquinoline-4-carboxylic acid, which consists in treating a solution of a soluble salt of 2-phenylquinoline-4-carboxylic acid with an aqueous solution of a soluble mercuric salt, separating the precipitate formed and drying it.
5. The process of making the mercury salt of 2-phenylquinoline-4-carboxylic acid, which consists in treating a solution of a sodium salt of 2-phenylquinoline-4-carboxylic acid with an aqueous solution of mercuric chloride, $HgCl_2$, separating the precipitate formed and drying it.

6. The process of making the mercury salt of 2-phenylquinoline-4-carboxylic acid, which consists in treating a solution of a soluble salt of 2-phenylquinoline-4-carboxylic acid with an aqueous solution of a soluble mercuric salt, separating the precipitate formed and heating the filtrate, whereby a second precipitate is formed.

In testimony whereof we have signed the foregoing specification.

MOSES L. CROSSLEY.
MAURICE L. DOLT.